United States Patent [19]

Bell et al.

[11] 3,922,466

[45] Nov. 25, 1975

[54] SILANE COUPLING AGENTS

[75] Inventors: Reuben H. Bell, Cincinnati; Kevin M. Foley, Hebron, both of Ohio

[73] Assignee: Owens-Corning Fiberglas Corporation, Toledo, Ohio

[22] Filed: Sept. 16, 1974

[21] Appl. No.: 506,668

[52] U.S. Cl. ............. 428/388; 260/333; 260/345.1; 260/346.8; 260/448.8 R; 427/299; 428/391
[51] Int. Cl.$^2$ ...................... B32B 9/00; B32B 15/00
[58] Field of Search ....... 260/448.8 R, 346.8, 345.1, 260/333; 161/193, 208, 170; 117/126

[56] References Cited
UNITED STATES PATENTS

| | | |
|---|---|---|
| 3,678,089 | 7/1972 | Berger............................ 260/448.8 R |
| 3,692,812 | 9/1972 | Berger............................ 260/448.8 R |
| 3,705,073 | 12/1972 | Marzocchi et al. ................ 161/193 |
| 3,853,692 | 12/1974 | Clayton et al. ...................... 161/193 |
| 3,865,682 | 2/1975 | Marzocchi........................... 161/193 |
| 3,867,420 | 2/1975 | Morehouse et al. ......... 260/448.8 R |

*Primary Examiner*—William J. Van Balen
*Attorney, Agent, or Firm*—Carl G. Staelin; John W. Overman; Keith V. Rockey

[57] ABSTRACT

The silane coupling agents are prepared by reaction of the mercapto silane with a carboxylic acid anhydride whereby the mercapto group adds across the double bond of the anhydride. The compounds can be converted to the corresponding diacid by reaction with water, and are useful as coupling agents for bonding glass fibers to resinous plastics, including thermoplastics and thermosetting resins and the elastomeric materials.

29 Claims, No Drawings

SILANE COUPLING AGENTS

This invention relates to organo silicon compounds and more particularly to organo silanes for use as coupling agents and as flame retardants.

Glass fiber coupling or anchoring agents for use in the treatment of glass fibers have been known for a number of years. These coupling agents are usually organo silicon compounds which contain at least one organic group attached directly to the silicon atom, which is most frequently substituted with a reactive functional group (i.e., an amino group, a mercapto group, a hydroxy group, an epoxy group etc.). The remaining valences of the silicon atom are usually taken up by hydrolyzable groups, most frequently hydrolyzable groups.

Compounds which have achieved widespread acceptance in the art include:

$H_2N-CH_2-CH_2-CH_2-Si(OC_2H_5)_3$
Gamma-aminopropyltriethoxy silane
$HS-CH_2-CH_2-CH_2-Si(OCH_3)_3$
Gamma-mercaptopropyltriethoxy silane

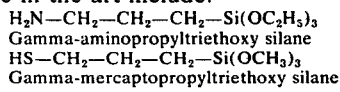

Gamma-glycidoxypropyltrimethoxy silane

It is generally believed that, in the treatment of glass fibers with such organo silicon compounds, the hydrolyzable groups react with the surfaces of the glass fibers

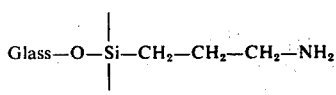

to leave the functional group available for reaction with a thermosetting resin when the treated glass fibers are used for reinforcement for such resins, or for reaction with an elastomeric material when the treated glass fibers are used as reinforcement for elastomeric materials in the manufacture of glass fiber-reinforced elastomeric products.

While the coupling agents employed to date are quite effective in promoting a strong bonding relationship between glass fibers and such resins or elastomeric materials, research has continued to find coupling agents which contain more reactive functional groups and which are susceptible to a wider variety of uses.

One of the primary difficulties with many of the coupling agents which are in use today is that they hydrolyze quite rapidly in aqueous medium to form the corresponding silanols and siloxanes. As a result, such silanes are difficult to employ in treating compositions embodying an emulsion, such as, for example, an emulsion of a film-forming material because the hydrolysis of the silane in the emulsion tends to cause coagulation of the film-forming material, particularly where the film-forming material is an elastomeric material.

It is accordingly an object of the present invention to provide certain new organo silanes which can be used as coupling agents for treatment of glass fibers to promote a secure bonding relationship between glass fibers and resinous plastics and elastomeric materials in the manufacture of glass fiber reinforced plastic and elastomeric products.

It is a more specific object of the invention to provide organo silanes containing an organic group substituted by a functional group which is highly reactive with thermosetting plastics and elastomeric materials for use as coupling agents for such plastics and elastomeric materials with glass fibers.

It is another object of the present invention to provide new organo silanes having high reactive organic groups and having improved stability in aqueous media.

It is a further object of the invention to provide glass fibers treated with organo silicon compounds for use as reinforcement for plastics and elastomers in the manufacture of glass fiber reinforced plastic and elastomeric products.

The concepts of the present invention reside in organo silicon compounds prepared by reaction of a mercapto silane and a carboxylic acid anhydride containing ethylenic unsaturation. It has been found that the reaction, carried out in the presence of amino catalysts, results in addition of the mercapto group across the double bond of anhydride. The compounds formed have the general formula:

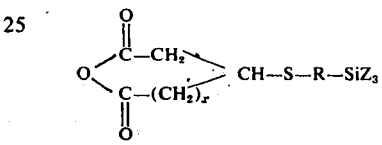

wherein $x$ is zero or an integer from 1 to 2, R is a divalent organic group containing 3 to 10 carbon atoms and Z is a $C_1$ to $C_4$ alkoxy group (e.g., methoxy, ethoxy, propoxy, etc.) or a beta-haloalkoxy group of the formula:

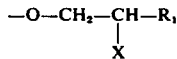

wherein X is halogen, preferably chlorine or bromine, and $R_1$ is hydrogen or $C_1$ to $C_3$ alkyl (e.g., methyl, ethyl, propyl, isopropyl, etc.).

When the foregoing compounds are contacted with a stoichiometric amount of water, they are converted to the corresponding diacid.

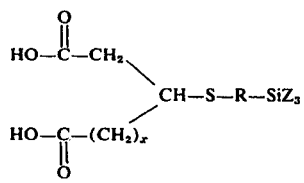

where $x$, R and Z have the meaning referred to above.

Mercapto silanes used in the preparation of the compounds of the invention have the formula:

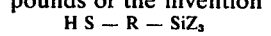

wherein R is preferably $C_3$ to $C_6$ alkylene
$-(CH_2)_y-$
where $y$ is 3 to 6, and a group

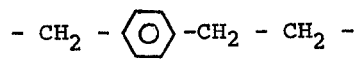

Compounds where Z is a β-haloalkoxy group can be prepared in accordance with the procedures outlined in copending applications Serial Nos.

Suitable mercapto silanes include gamma-mercaptopropyltrimethoxysilane, gamma-mercaptopropyltrimethoxysilane, delta-mercaptobutyltrimethoxysilane, gamma-mercaptopropyltri (β-chloroethoxy) silane, gamma-mercaptopropyltri (β-chloropropoxy) silane, delta-mercaptobutyltri (β-bromoethoxy) silane, mercaptomethylphenylethyltrimethoxysilane, etc.

A number of anhydrides may be used in the preparation of the compounds of the invention; they have the general formula:

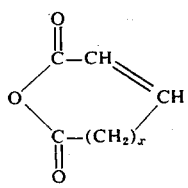

where x is as described above. Preferred is maleic anhydride.

The reaction between the unsaturated anhydride and the mercapto silane is carried out in the presence of an amine in accordance with the method of Dmuchovsky et al. [[J.A.C.S. 86, 2874 (1964) and J. Org. Chem. 31, 865 (1966)]. Preferred amines are trialkyl amines, pyridine and like tertiary amines.

Representative of compounds of the present invention include the following:

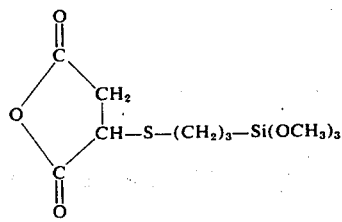

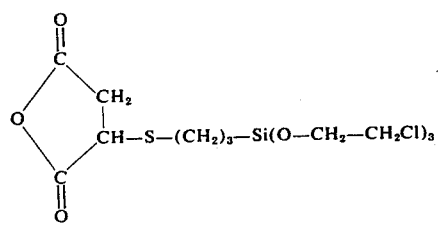

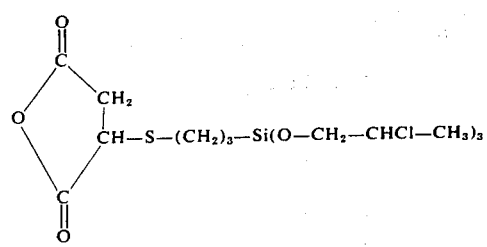

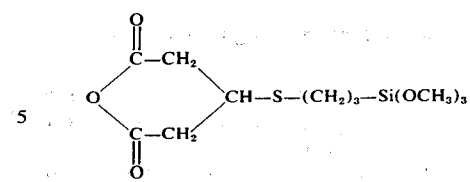

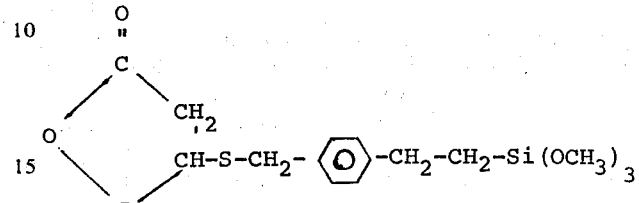

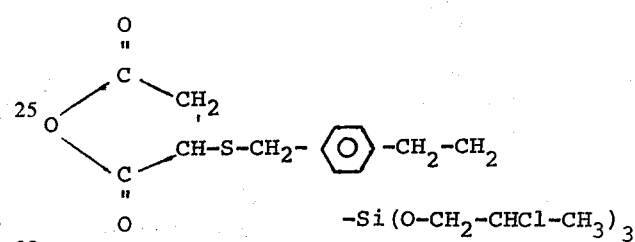

Compounds of this type can be reacted with water to form the corresponding diacids as described; the corresponding diacids have the formulae:

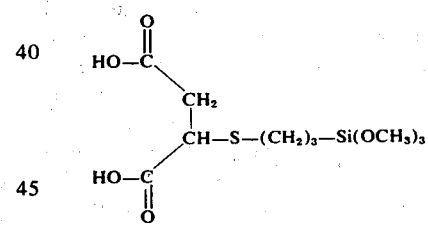

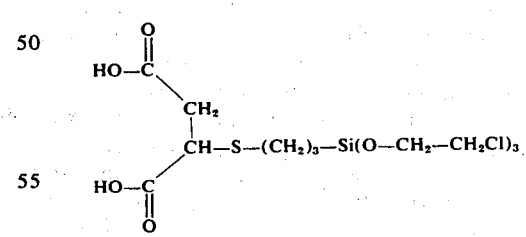

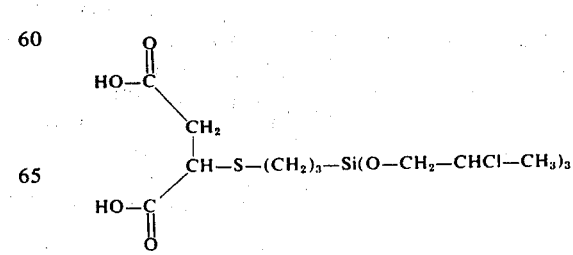

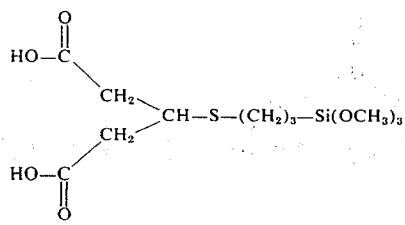

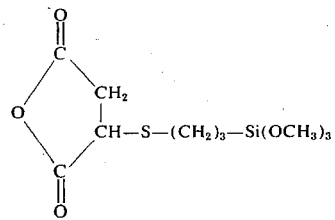

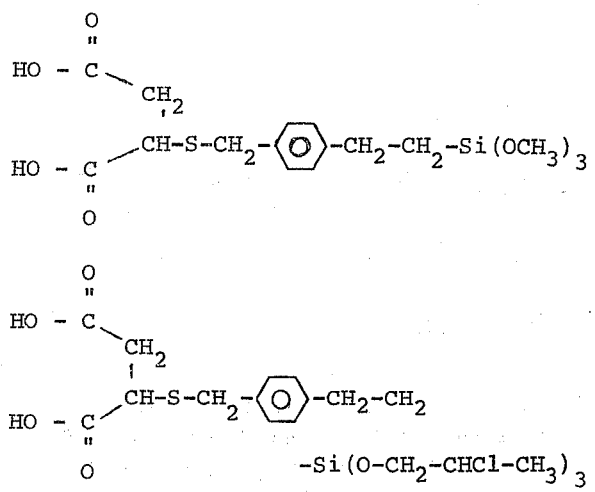

respectively. In forming the diacid, use should preferably not be made of an excess of water where Z is an alkoxy group if it is desired to form the corresponding silane. In actual use of the compounds of the invention, as described more fully hereinafter, the compounds are preferably placed in an aqueous dispersion in a size composition, and the alkoxy group is hydrolyzed. For this reason, the invention includes not only the silanes but also the corresponding hydrlysis products, the silanols and polysiloxanes.

The silanes of the present invention are useful as coupling agents in establishing a secure bonding relationship between glass fibers and elastomeric materials or thermosetting resins. They can also be blended along with fillers in various plastics to bond the filler to the plastic.

Having described the basic concepts of the invention, reference is now made to the following examples which are provided by way of illustration, and not by way of limitation, of the practice of the invention in the preparation and use of the coupling agents of the invention.

EXAMPLE 1

This example illustrates the reaction of a mercapto silane with maleic anhydride in the presence of pyridine.

About 14.7 g (0.15 mole) of maleic anhydride is suspended in 100 g of pentane, and then 12.9 g (0.15 mole) of pyridine is added. Thereafter, 30.0 g (0.15 mole) of gamma-mercaptopropyltrimethoxysilane is added to the reaction mixture. The pentane begins to boil after a few minutes.

Stirring of the reaction mixture is continued for 2 hours as the heat subsides. The reaction mixture separates into two phases, the upper phase being pentane and the lower phase being a dark liquid, having the formula:

EXAMPLE 2

This example illustrates the use of compounds of this invention as coupling agents in a size composition.

The compound prepared in Example 1 is formulated into the following glass fiber size composition:

| Size Composition | |
|---|---|
| Polyester resin (AD 502) | 3 % by weight |
| Compound of Example 1 | 0.5 % by weight |
| Water | 96.5% by weight |

The pH of the size is adjusted to 4.0 by the addition of acetic acid.

The compound of Example 1 reacts with water in the size to form the corresponding diacid:

which is further hydrolyzed in the size to form the corresponding silanols and polysiloxanes.

The foregoing size composition is used to treat glass fibers, which are then formed into standard glass fiber-reinforced polyester test rings. For purposes of comparison, two additional sizes are formulated as the above composition, except that one contains vinyltrimethoxysilane as the coupling agent and the other contains no silane at all.

The test rings are subjected to tests to determine the shear strength of the rings as a measure of the efficacy of the coupling agent. The tests are carried out with the test rings in the dry state, and after the rings have been contacted with boiling water for 24 hours.

The results of these tests are set forth in the following table:

| Silane | Shear strength (Dry) psi × $10^3$ | Shear strength (boil) psi × $10^3$ |
|---|---|---|
| None | 2.79 | 0.18 |
| Vinyltrimethoxysilane | 2.36 | 1.15 |
| Compd. of Example 2 | 4.08 | 1.22 |

The foregoing data illustrate that the compounds of the invention function well as coupling agents.

EXAMPLE 3

This example illustrates the reaction of delta-mercaptobutyltriethoxysilane with maleic anhydride.

Using the procedure described in Example 1, delta-mercaptobutyltriethoxysilane is reacted with maleic anhydride in the presence of tripropylamine. The product of the reaction is found to have the formula:

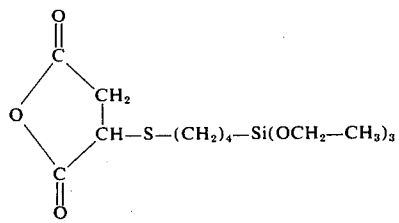

The above compound is then converted to the free acid by reaction with a molar equivalent of water; the free acid has the formula:

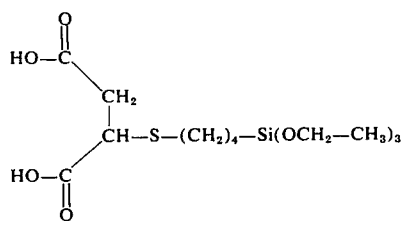

EXAMPLE 4

This example illustrates the reaction of gamma-mercaptopropyltri (β-chloroethoxy) silane with maleic anhydride.

Using the procedure of Example 1, the silane is reacted with maleic anhydride in the presence of triethylamine. The product is the compound:

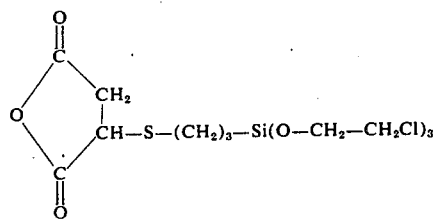

which can be converted to the free acid by reaction with water. The free acid is the compound:

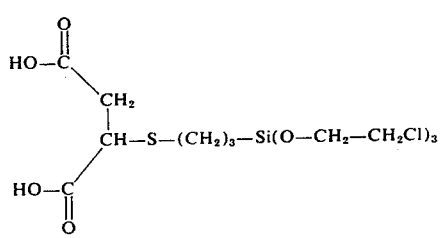

EXAMPLE 5

The procedure of Example 1 is again repeated using mercaptomethylphenylethyltrimethoxysilane and maleic anhydride, with pyridine as the base.

The product has the formula:

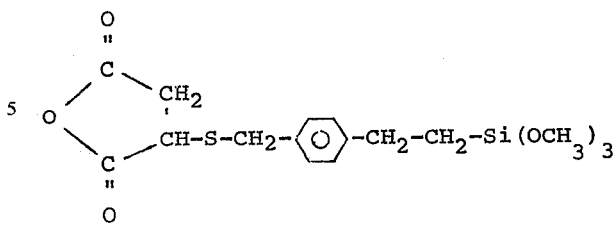

which can be converted to the diacid

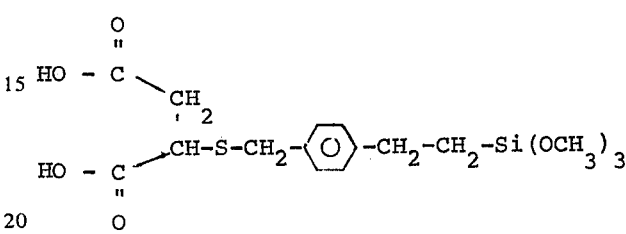

as described in Example 3.

EXAMPLE 6

Using the procedure of Example 1, mercaptomethylphenylethyltri (β-chloropropoxy) silane is reacted with maleic anhydride in the presence of tripropylamine. The product has the formula:

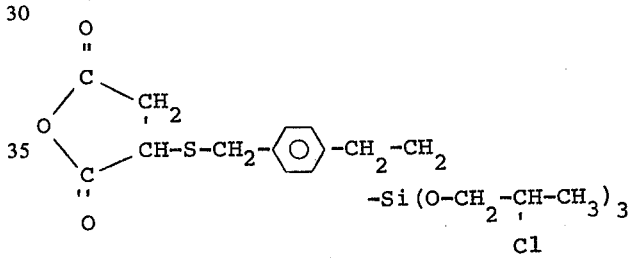

which can be converted to the free acid with water.

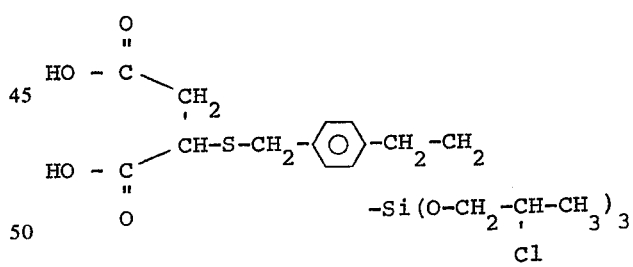

As will be appreciated by those skilled in the art, the silanes of the present invention can be formulated into a variety of compositions for use in the treatment of glass fibers in the manufacture of glass fiber reinforced resin products including glass fiber reinforced plastics, laminates and coated fabrics, and in the manufacture of glass fiber reinforced elastomeric products such as drive belts, rubber tires and the like.

The term "glass fibers", as used herein, is intended to refer to and include (1) continuous fibers formed by rapid attenuation of hundreds of streams of molten glass and to strands formed when such continuous glass fiber filaments are gathered together as they are being formed; and to yarns and cords formed by plying and- /or twisting a number of strands together, and to woven and non-woven fabrics which are formed of such glass fiber strands, yarns or cords, and (2) discontinuous fibers formed by high pressure steam, air or other suitable attenuating force directed onto multiple streams of molten glass issuing from a glass melting bushing or from an orifice containing spinner, and to yarns that are formed when such discontinuous fibers are gathered together to form a sliver which is drafted into a yarn; and to woven and non-woven fabrics formed of such yarns of discontinuous fibers, and (3) combinations of such continuous and discontinuous fibers in strands, yarns, cords and fabrics formed thereof.

The silane coupling agents of the present invention can simply be formulated into an aqueous medium for application to the glass fibers to form a thin film from the silane. However, it is frequently preferred to formulate the silanes of the invention in combination with a film-forming material. A wide variety of film-forming materials can be used for this purpose and includes polyester resins, polyamide resin, polyolefin resins (e.g., polyethylene, polypropylene, etc.), polyepoxide resins, vinly resins (e.g., polyvinyl chloride, polyvinyl acetate, polyvinyl alcohol, polyvinyl pyrrolidone, etc.), waxes, partially dextrinized starch as well as numerous others. Such materials are themselves well known to those skilled in the art and are described in U.S. Pat. Nos. 2,931,739, 2,958,114, 3,040,413, 3,252,278, 3,424,608 and others. Combinations of two or more of the above film-forming materials can also be used.

The size compositions can also be formulated to include any of a variety of wetting agents, glass fiber lubricants, etc., which are likewise known to the art. The size compositions can be formulated in aqueous media or in inert organic solvents, depending on the intended use of the treated glass fibers and the nature of the film-forming material or materials employed.

Examples of such size compositions which can be employed in the treatment of glass fibers for use in the manufacture of glass fiber reinforced resins and elastomeric products include the following.

EXAMPLE 7

Size Composition

| | Parts by weight |
|---|---|
| Silane of Example 1 | 1.0 |
| Polypropylene emulsion | 5.5 |
| Water | 93.5 |

EXAMPLE 8

Size Composition

| | Parts by weight |
|---|---|
| Silane of Example 3 | 1.1 |
| Wetting agent (Nopcogen 16L) | 0.1 |
| Water | 98.8 |

EXAMPLE 9

Size Composition

| | Parts by weight |
|---|---|
| Silane of Example 4 (anhydride form) | 1.5 |
| Epoxy resin (DER 330) | 7.0 |
| Diacetone alcohol | 91.5 |

EXAMPLE 10

Size Composition

| | Parts by weight |
|---|---|
| Silane of Example 5 | 1.5 |
| Saturated polyester resin | 3.0 |
| Polyvinyl alcohol | 1.0 |
| Wetting agent | 0.5 |
| Water | 94.0 |

EXAMPLE 11

Size Composition

| | Parts by weight |
|---|---|
| Partially dextrinized starch | 8.0 |
| Hydrogenated vegetable oil | 1.5 |
| Wetting agent | 0.5 |
| Silane of Example 6 | 1.8 |
| Water | 88.2 |

In formulating size compositions with the coupling agents of the present invention, the coupling agent is generally employed in an amount constituting from 0.1 to 10% by weight of the composition, and the film-forming binder in an amount from 1 to 25% by weight of the composition. These amounts are not critical to the practice of the invention and can be varied as desired. The compositions of Examples 7 to 11 can be applied to glass fibers as they are formed or afterwards, in accordance with conventional procedures.

Glass fibers coated with the silanes of the present invention can be incorporated in the form of fibers, yarns, rovings, fabrics and the like with resin materials, including epoxy resins, polyester resin, polyamide resins as well as numerous other thermosetting plastics in amounts such that the treated glass fibers constitute from 1 to 20% by weight of the plastic laminate or coated fabric formed. The coating on the individual glass fibers, comprising as the essential component the silanes of the present invention, serves to provide a secure bonding relationship between the glass fiber surfaces and the resin.

Glass fibers sized with a composition embodying the silanes of the present invention can also be used in the manufacture of glass fiber reinforced elastomeric products. In the preferred practice of this concept of the invention, the glass fibers which have been sized with one of the compositions of Examples 7 to 11 are formed into strands, yarns, cords formed of strands which are piled and twisted together, or threads, hereinafter referred to as bundles, are subjected to impregnation with an aqueous composition formulated to include a resorcinol-aldehyde resin component and an elastomer component.

A wide variety of such impregnating compositions are well known to those skilled in the art and are described in U.S. Pat. Nos. 3,402,064, 3,424,608, 3,567,671, 3,591,357 and numerous others. This concept may be illustrated by way of the following examples.

EXAMPLE 12

Using the procedure described in U.S. Pat. No. 3,567,671, an impregnating composition is formulated as follows:

| Impregnating Composition | Parts by weight (solids basis) |
|---|---|
| Resorcinol-formaldehyde resin (Penaclyte R 2170) | 5.0 |
| Vinyl pyridine-butadiene-styrene terpolymer (Gentac PS) | 30.0 |
| Vinyl chloride-vinylidene chloride copolymer (Dow Latex 874) | 20.0 |
| Microcrystalline paraffin wax | 6.0 |

Water constitutes the balance of the composition and is present in an amount sufficient to adjust the solids content of the composition to within the range of 20 to 55% solids by weight. The impregnation can be carried out in accordance with the procedure described in U.S. Pat. NO. 3,424,608 whereby the solids of the impregnating composition serve to coat the fibers which have been previously sized with one of the compositions of Examples 7 to 11 and serve to separate the sized fibers each from the other to cushion the fibers and protect the sized fibers from destruction by mutual abrasion.

EXAMPLE 13

Glass fibers sized with the composition of Example 11 are impregnated with the following impregnating composition of the type illustrated in Example 12, except that the vinyl chloride-vinylidene chloride copolymer component is replaced by a dicarboxylated butadiene-styrene resin:

| Impregnating Composition | Parts by weight (solids) |
|---|---|
| Resorcinol-formaldehyde resin | 5.0 |
| Vinyl pyridine-butadiene-styrene terpolymer | 30.0 |
| Dicarboxylated butadiene-styrene resin (Pliolite 4121 - Goodyear) | 20.0 |
| Microcrystalline paraffin wax | 6.0 |
| Water to solids content of 35% | |

Application of this impregnating composition can be made in an amount sufficient to deposit in the glass fiber bundle solids constituting from 15 to 40% by weight of the glass fiber system.

In accordance with a further concept of this invention, the novel silanes of this invention containing a beta-haloalkoxy group can be formulated into an impregnating composition containing a resorcinol-aldehyde resin component and an elastomer component. As indicated above, the novel silanes of the present invention are particularly suitable for use in such impregnating compositions because the beta-haloalkoxy group stabilizes the silane in the alkaline impregnating composition upon hydrolysis which in turn prevents undesirable coagulation of the latex component of the impregnating composition.

This concept of the invention may be illustrated by way of the following examples.

EXAMPLE 14

Using the procedure described in U.S. Pat. No. 3,567,671, and impregnating composition is formulated in accordance with the following

| Impregnating Composition | Parts by weight |
|---|---|
| Resorcinol-aldehyde resin | 2–10 |
| Vinyl pyridine-butadiene-styrene terpolymer | 20–60 |
| Vinyl chloride-vinylidene chloride copolymer | 15–40 |
| Microcrystalline paraffin wax | 5–30 |
| Silane of Example 4 | 0.1–10 |

It is found that the above composition, which is diluted with water to adjust the solids content to within the range of 20 to 55% by weight solids, is stable over long periods of time. No coagulation of the latex components is observed.

EXAMPLE 15

| Impregnating Composition | Parts by weight |
|---|---|
| Resorcinol-formaldehyde resin | 2–10 |
| Vinyl pyridine-butadiene-styrene terpolymer | 20–60 |
| Dicarboxylated butadiene-styrene resin (Pliolite 4121) | 15–40 |
| Microcrystalline wax | 5–30 |
| Silane of Example 6 | 0.1–10 |

EXAMPLE 16

| Impregnating Composition | Parts by weight |
|---|---|
| Resorcinol-formaldehyde resin | 2–10 |
| Vinyl pyridine-butadiene-styrene terpolymer | 20–60 |
| Silane of Example 9 | 0.1–10 |

EXAMPLE 17

| Impregnating Composition | Parts by weight |
|---|---|
| Resorcinol-formaldehyde resin | 2–10 |
| Natural rubber latex or SBR latex | 20–60 |
| Silane of Example 4 | 0.1–10 |

EXAMPLE 18

| Impregnating Composition | Parts by weight |
|---|---|
| Resorcinol-formaldehyde resin | 2–10 |
| Vinyl pyridine-butadiene-styrene terpolymer | 20–60 |
| Silane of Example 6 | 0.1–10 |

Each of the compositions of Examples 15 and 18, diluted with water to adjust the solids content, can be employed in the treatment of bundles of glass fibers which may or may not contain a size coating as described above.

As will be appreciated by those skilled in the art, the compositions of Examples 14 to 18 can be applied as a size, preferably with greater dilution to adjust the solids content to within the range of 15 to 40% solids by weight, to individual glass fibers to form a thin film coating on the surfaces thereof. The resorcinol-aldehyde resin component and the elastomer component serve as film-formers on the glass fiber surfaces to provide a coating which affords maximum protection to the fibers from destruction through mutual abrasion for use in the manufacture of glass fiber reinforced elastomeric products.

As used herein, the term "elastomer" is intended to mean and include natural rubber in the cured or uncured stage, vulcanized or unvulcanized stage, and synthetic organic elastomeric materials such as nitriles, acrylics and esters and terpolymers thereof with styrene and acrylonitriles, styrene and vinyl pyridine, and EPDM rubbers as represented by butadiene polymers and copolymers with monoolefins such as butadienes-tyrene vinyl pyridine terpolymers, chloroprene, isoprene, neoprene, isobutyl rubber and the like elastomeric polymers and copolymers in their cured or uncured stages, and vulcanized or unvulcanized stages. Included also are the EPDM rubbers, such as formed by the interpolymerization of ethylene, an alpha-monoolefin having from 3–20 carbon atoms, such as propylene, and polyene, such as dicyclopentadiene, 1,4-hexadiene and preferably in an alkylene or alkylidene norbornene, such as 5-alkylidene-2-norbornene and the like in which the alkylidene group numbers from 2–13 carbon atoms, and polysulfone rubbers.

In facilitating the combination of glass fibers treated in accordance with the present invention with elastomeric materials, the individual glass fibers containing a coating on the surfaces thereof from Examples 7 to 11 or bundles of glass fibers impregnated with one of the compositions of Examples 14 to 18 are mixed with elastomeric material or otherwise laid down in the desired arrangement for combination with the elastomeric material, as in the manufacture of glass fiber-reinforced belts or in the manufacture of rubber tires reinforced with cords of glass fibers. The combination of glass fibers and elastomeric material is processed in a conventional manner by mold or cure under heat and compression or vulcanized for advancement of the elastomeric material to a cured or vulcanized stage while in combination with the treated glass fibers or bundles of glass fibers whereby the glass fibers or bundles of glass fibers become strongly integrated with the elastomeric material in the glass fiber-elastomeric product.

In the final system, the elastomeric material with which the glass fibers or bundles of glass fibers are combined, constitutes a continuous phase. Such continuous phase elastomeric materials may comprise elastomers or rubbers of the type incorporated into the treating compositions or the elastomeric material can differ therefrom. It is believed that the tie-in between the individually coated glass fibers or the impregnated bundles of glass fibers and the elastomeric materials forming the continuous phase occurs primarily during cure or vulcanization of the elastomeric material in combination with the treated glass fibers.

It will be apparent that various changes and modifications can be made in the details of procedure, formulation and use without departing from the spirit of the invention, especially as defined in the following claims.

We claim:

1. A compound of the formula:

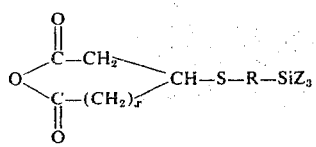

wherein $x$ is 0 or an integer from 1 to 2, R is $C_3$ to $C_6$ alkylene or a group

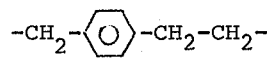

and Z is a group selected from the group consisting of a $C_1$ to $C_4$ alkoxy group and a halo-alkoxy group of the formula:

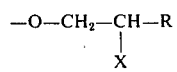

wherein X is halogen and R is hydrogen or $C_1$ to $C_3$ alkyl.

2. A compound as defined in claim 1 wherein Z is an alkoxy group.

3. A compound as defined in claim 1 wherein Z is a halo-alkoxy group.

4. A compound as defined in claim 1 wherein $x$ is 0.

5. A compound as defined in claim 1 wherein the compound has the formula:

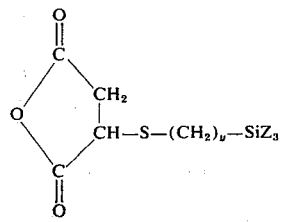

wherein Y is an integer from 3 to 6.

6. A compound as defined in claim 1 wherein the compound has the formula:

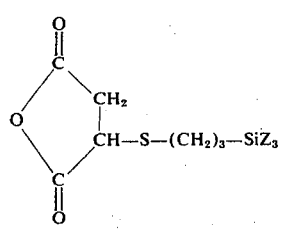

7. A compound of the formula:

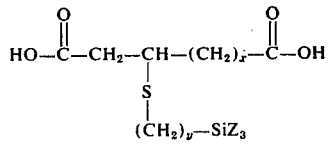

wherein $x$ is 0 or an integer from 1 to 2 and Z is a group selected from the group consisting of a $C_1$ to $C_4$ alkoxy group and a halo-alkoxy group of the formula:

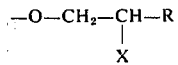

wherein X is halogen and R is hydrogen or $C_1$ to $C_3$ alkyl.

8. A compound as defined in claim 7 wherein Z is an alkoxy group.

9. A compound as defined in claim 7 wherein Z is a halo-alkoxy group.

10. A compound as defined in claim 7 wherein x is 0.

11. A compound as defined in claim 7 wherein the compound has the formula:

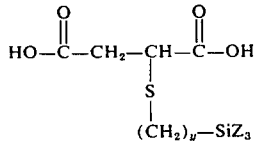

wherein y is an integer from 3 to 6.

12. A compound as defined in claim 7 wherein the compound has the formula:

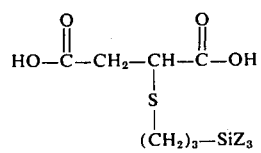

13. A compound having the formula:

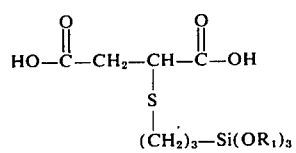

wherein $R_1$ is $C_1$ to $C_4$ alkyl, and the hydrolysis products thereof.

14. A compound having the formula:

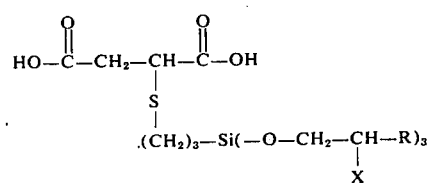

wherein X is halogen and R is hydrogen or $C_1$ to $C_3$ alkyl, and the hydrolysis products thereof.

15. A compound as defined in claim 14 wherein X is chlorine.

16. A compound as defined in claim 14 wherein R is methyl.

17. A compound of the formula:

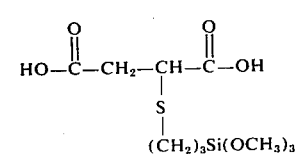

and the hydrolysis products thereof.

18. A compound of the formula:

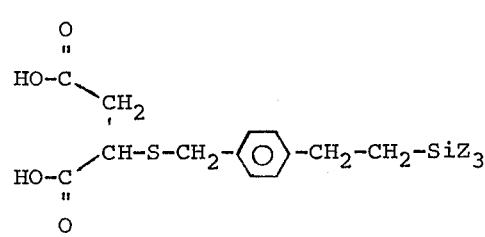

wherein Z is $C_1$ to $C_4$ alkoxy or halo-alkoxy group of the formula:

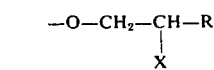

wherein X is halogen and R is hydrogen or $C_1$ to $C_3$ alkyl, and the hydrolysis products thereof.

19. A compound as defined in claim 18 wherein Z is alkoxy.

20. A compound as defined in claim 18 wherein the compound has the formula:

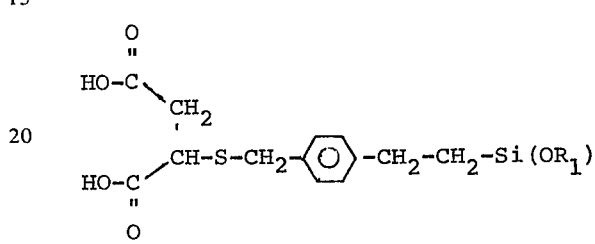

where $R_1$ is $C_1$ to $C_4$ alkyl.

21. Glass fibers having a thin coating thereon to improve the bonding relationship between glass fibers and elastomeric materials or plastic resins, said coating formed from a compound of the formula:

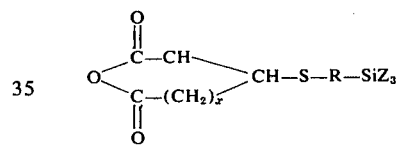

wherein x is 0 or an integer from 1 to 2, R is $C_3$ to $C_6$ alkylene or a group

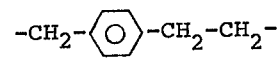

and Z is a group selected from the group consisting of a $C_1$ to $C_4$ alkoxy group and a halo-alkoxy group of the formula:

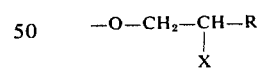

wherein X is halogen and R is hydrogen or $C_1$ to $C_3$ alkyl.

22. Glass fibers as defined in claim 21 wherein the coating also includes a film forming material.

23. Glass fibers as defined in claim 21 wherein the coating also includes a blend of a resorcinol-aldehyde resin and an elastomer.

24. Glass fibers as defined in claim 21 wherein the glass fibers are in the form of a bundle and the coating constitutes a size coating on the individual glass fibers forming the bundle, said bundle including an impregnant therein comprising an elastomer compatible material.

25. Glass fibers as defined in claim 24 wherein the fibers forming the bundle are in the form of strands which have been plied and twisted together.

26. A glass fiber bundle formed of a plurality of glass fibers and an impregnant in the bundle, said impregnant comprising a blend of a compound of the formula:

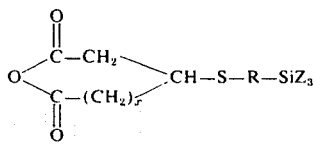

wherein $x$ is 0 or an integer from 1 to 2, R is $C_3$ to $C_6$ alkylene or a group

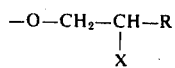

and Z is a group selected from the group consisting of a $C_1$ to $C_4$ alkoxy group and a halo-alkoxy group of the formula:

$$-O-CH_2-CH-R$$
$$\phantom{-O-CH_2-C}|$$
$$\phantom{-O-CH_2-CH-}X$$

wherein X is halogen and R is hydrogen or $C_1$ to $C_3$ alkyl, a resorcinol-aldehyde and an elastomer.

27. A glass fiber bundle formed of a plurality of glass fibers, each of the glass fibers having a thin sized coating thereon, said coating being formed from a compound from the formula:

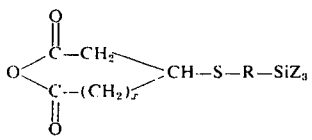

wherein $x$ is 0 or an integer from 1 to 2, R is $C_3$ to $C_6$ alkylene or a group

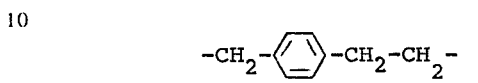

and Z is a group selected from the group consisting of a $C_1$ to $C_4$ alkoxy group and a halo-alkoxy group of the formula:

$$-O-CH_2-CH-R$$
$$\phantom{-O-CH_2-C}|$$
$$\phantom{-O-CH_2-CH-}X$$

wherein X is halogen and R is hydrogen or $C_1$ to $C_3$ alkyl, and an impregnant in the bundle.

28. In a glass fiber reinforced product comprising a material selected from a group consisting of an elastomer, a thermosetting resin and a thermoplastic resin constituting a continuous phase in which glass fibers are distributed, the improvement comprising as the glass fiber reinformcement glass fibers as defined in claim 21.

29. In a glass fiber reinforced elastomeric product in which an elastomeric material constitutes the continuous phase in which the glass fibers are distributed, the improvement comprising a glass fiber bundle as defined in claim 27.

* * * * *